United States Patent Office 3,567,681
Patented Mar. 2, 1971

3,567,681
STABILIZER COMPOSITIONS FOR HALOGENATED RESINS, EMPLOYING THE METAL SALTS OF NEOACIDS
Lewis B. Weisfeld, Highland Park, and Carl W. Pause, Spotswood, N.J., assignors to Carlisle Chemical Works, Inc., Reading, Ohio
No Drawing. Filed Sept. 3, 1965, Ser. No. 485,094
Int. Cl. C08f 45/62
U.S. Cl. 260—45.75
9 Claims

ABSTRACT OF THE DISCLOSURE

The light and heat stabilization of halogen-containing resins is further improved by metal soap components having the carboxylic acid moiety wholly or in part formed by a neo-acid of the following general formula:

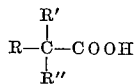

wherein R, R' and R" are alkyl groups having a total of 3–18 carbons and undesirable plating-out of pigments and similar additives is reduced.

---

This invention relates to stabilized halogenated hydrocarbon resin compositions having improved properties.

It is well known that halogen containing hydrocarbon resins deteriorate when exposed to heat and light and require the addition of stabilizers. It is also known that, so far, no single stabilizer has been found which would satisfy all requirements; with increasing knowledge of the complexities of the stabilizer problem, more and more quasi tailor-made stabilizer combinations are offered, whose compositions are adjusted and adapted to the specific resin blends and their manner of application.

Nonetheless, most of those combination stabilizers contain certain basic ingredients whose effectiveness has been generaly recognized. One of these ingredients is represented by metal or organometal salts of carboxylic acids, which for the sake of brevity, will be called hereafter metal soaps.

It is also generally recognized that the stabilizing effect of such soaps is due essentially to the metal moiety of the soaps and that the carboxylic acid has essentially the purpose to serve as convenient transporting agent for introducing the metal into the stabilizer system provided that the carboxylic acid group has a size and configuration to render the soap compatible with the resin. However, it is also well known in the art that such soaps have certain subsidiary effects which, in processing, are important. These effects include stabilizer viscosity, plasticizer compatibility with the stabilizer, plastisol viscosity, "plate-out" during processing, and film clarity after processing. "Plate-out" is defined as the undesirable tendency of certain pigment containing vinyl plastic formulations to cause the pigment and other ingredients to transfer from the plastic matrix to the calender rolls or metallic processing equipment. Film clarity is defined as the lack of opacity or haziness observed with plied up sections of unpigmented vinyl films.

It is, therefore, the principal object of the present invention to provide stabilized halogen-containing resins wherein the metal soap component of the stabilizer system does not substantially interfere with viscosity and film clarity of the system while retaining optimum stabilizer properties.

Other objects and advantages will become apparent from a consideration of the specification and claims.

We have found that metal soap stabilizers whose carboxylic acid moiety is wholly or in part formed by a "neo" acid, do not show, or show to much lesser degree, the above recited undesirable properties of the conventional soaps of straight chain carboxylic acids.

The neo-acids are essentially trialkyl acetic acids of the formula

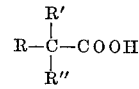

R, R', and R" being alkyl, and are prepared by reacting olefin feed streams with carbon monoxide and steam in the presence of a suitable catalyst. Their composition depends on the composition of the feed stream, and they will mostly represent mixtures of various acids. This is of no importance for our purposes as we need not use pure soaps, provided that the average number of C atoms is in the range of $C_5$ to $C_{20}$. Generally, the same $C_n$ neo-acids will be used as the conventional acids, except that branched acids of the $C_5$ type can also be employed.

The metal ion M of the "neo"-acid soaps

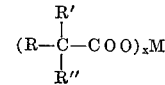

may be any of the metals usually employed as stabilizers, particularly those of the first and second group of the periodic system, such as Li, K, Na, Mg, Ca, Sr, Ba, Mg, Zn, Cd, but also Sn, Sb, and Pb. Instead of the metal, organometal groups such as organotin, organoantimony, or organolead radicals can be employed; such radicals have the general formula $R'''_x Me$ wherein $R'''$ is a hydrocarbon radical, Me is Sn, Sb, or Pb, and $x$ is an integer between 1 and $n-1$, $n$ being the valence of Me.

The neo-acid metal soaps may be used for all types of halogen-containing resins for which the conventional metal soaps and organometallic stabilizers are normally employed. Such resins are particularly vinyl chloride and vinylidene chloride resins, or resins formed by joint polymerization of vinyl chloride or vinylidene chloride with each other or with other copolymerizable compounds. An illustrative list of such resins is, for instance, given in the assignee's Pat. No. 2,592,926.

The stabilizers may be incorporated into the resin in any suitable manner and can be used also for organosols and plastisols.

The following examples are given to illustrate the invention. All parts are given by weight, unless otherwise specified.

EXAMPLE 1

The following composite stabilizer systems were prepared for side-by-side comparison in a vinyl plastisol formulation:

| | #1, parts | #2, parts |
|---|---|---|
| Barium nonyl phenate, 11.7% Ba | 46.23 | 46.23 |
| Cadmium naphthenate-benzoate, 13.3% Cd | 16.54 | 16.54 |
| Zinc di(2-ethylhexoate), 19.15% Zn | 1.56 | |
| Zinc di(neooctanoate), 19.15% Zn | | 1.56 |
| Diphenyl isooctyl phosphite | 26.30 | 26.30 |
| Oleic acid | 4.70 | 4.70 |
| Butyl carbitol | 4.67 | 4.67 |

The formulation that these were tested in consisted of:

| | Parts |
|---|---|
| Polyvinyl chloride (Geon 101 EP) | 100 |
| Dioctyl phthalate | 45 |
| Epoxidized soybean oil | 5 |
| Stearic acid | 0.25 |

This formulation, containing 2.0 parts per hundred parts of the resin of either #1 or #2 was milled at 320° F. for 5 minutes on a two roll mill, then sheeted off. Samples of these sheets were then cut into pieces and placed in a circulating air oven at 350° F., and the degree of darkening (degradation) noted every 10 minutes. As concerns this "static" heat stability, no difference was observed between the samples.

Another portion of the milled sheets were piled up and press-polished (40 mils) at 350° F. for 10 minutes. The material containing stabilizer #2 remained water-clear, while that containing #1 developed an apparent haziness.

Separately, the above formulation was compounded containing 1.0 phr. (based on resin) of Watchung Red pigment and milled as above. After removing the plastic sheet from the rolls, a standard white (TiO₂ containing) "scrubber" stock was milled to pick up any of the pigment which might have plated out on the mill rolls. The amount of "plate-out" was estimated by comparison to standard pigmented stocks, and it was found that the formulation containing #1 stabilizer had relinquished 6 mg. of pigment (per 100 gm. of resin) while that containing #2 stabilizer had plated out only 2 mg. of pigment.

EXAMPLE 2

A stabilizer similar to number 2, above, was prepared but using cadmium di(2-ethylhexoate) (#3) or cadmium di(neooctanoate) (#4) instead of the cadmium naphthenate-benzoate. These were tested in analogous manner to Example 1. Stabilizer #4 gave vastly superior film clarity 40 mil press-polished section) compared to #3. Further, plate-out tests showed that the formulation stabilized with #3 ejected 20 mg. of red pigment, while that with #4 plated out only 16 mg.

EXAMPLE 3

A suspension of 6.05 parts of calcium oxide in 36.93 parts of mineral spirits and 9.08 parts of butyl caribtol was heated with either 39.94 parts of neodecanoic acid or, separately, 33.65 parts of 2-ethylhexoic acid. After the initial exotherm, heat was applied and the material dehydrated for 20 minutes at 115° C. 8.00 parts of zinc di(2-ethylhexoate), 19.0% Zn, were then added and the respective samples cooled. The compositions of each were adjusted and finally represented as follows:

| | #5, parts | #6, parts |
|---|---|---|
| Calcium 2-ethylhexoate (as Ca) | 4.4 | |
| Calcium neodecanoate (as Ca) | | 4.4 |
| Zinc 2-ethylhexoate (as Zn) | 1.55 | 1.55 |

Sample #6 was a thin fluid, while sample #5 was a thick gel, impractical for use. Each sample was then cut 50% with butyl carbitol. Sample #6 was found to be completely compatible with dioctyl phthalate, while sample #5 showed a large immiscible component. Stabilizing efficacy of each in a typical polyvinyl chloride formulation was equivalent.

As will be seen from the examples, the carboxylic acid of the metal soap component of stabilizer systems can be completely replaced by a "neo" acid, or only in part. In this respect, it must be taken into account that, at present, "neo" acids and their salts may be less readily available than the salts of the conventional carboxylic acids. It may, therefore, be of advantage to use only as much of the neo acid salt as required to obtain the desired fluidity of the stabilizer, clarity of the resin, and other properties. The amount will depend, to a certain extent, on the nature of the metal ion, on the plasticizer, and on the other components of the stabilizer system, and can be readily determined in a few preliminary routine tests.

Generally, the neo-acid metal soap stabilizer will be employed in amounts of 0.25 to 10 percent by weight of the total resin composition. In cases where metal soaps of carboxylic acids in amounts of more than 1 percent by weight of the resin composition are used, it may be sufficient when only about 5 percent of the total metal soap is in the form of neo-acid soap. The proportions will depend on the physical properties of the non neo-acid soap and on the properties of the other components of the entire resin system.

We claim:

1. An improved heat and light stabilized resin composition having increased resistance to loss of pigments and additives through transfer from the composition to metallic equipment during processing comprising a halogen-containing resin and about 1 to 10 percent by weight of a stabilizer mixture consisting essentially of (1) a material selected from the group consisting of a carboxylic acid salt selected from salts of metal of Group II of the Periodic Table, said carboxylic acid being different from neo-acid, an alkylphenate of said metals of Group II and mixtures thereof and (2) at least 5 percent by weight of a neo-acid soap of the formula:

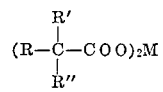

wherein R, R' and R'' are alkyl groups having a total of 3–18 carbon atoms and M is a metal of Group II of the Periodic Table different from the metal of the carboxylic acid salt, whereby plate-out during processing is reduced.

2. A resin composition as claimed in claim 1 wherein said resin is a resinous vinyl chloride polymer.

3. The composition of claim 1 wherein the total of carbon atoms in R, R' and R'' is 6.

4. The composition of claim 1 wherein the total of carbon atoms in R, R' and R'' is 8.

5. The improved heat and light stabilized resin composition of claim 2 wherein the acid portion of the neo-acid soap is selected from the group consisting of neo-octanoic acid and neodecanoic acid.

6. The improved light and heat stabilized resin composition of claim 5 wherein the metal of the carboxylate and the metal of the neo-acid soap are selected from the group consisting of calcium and zinc.

7. The improved heat and light stabilized resin composition of claim 6 wherein the metal carboxylate is zinc 2-ethylhexanate and the neo-acid soap is calcium neodecanate.

8. The improved heat and light stabilized resin composition of claim 5 wherein the metal carboxylate is cadmium napthenate-benzoate and the neo-acid soap is zinc neooctanate.

9. The improved heat and light stabilized resin composition of claim 1 wherein (1) is barium nonylphenate and (2) is a mixture of cadmium neooctanoate and zinc neooctanoate.

References Cited

UNITED STATES PATENTS

| 2,510,035 | 5/1950 | Mack | 260—45.85 |
| 2,921,917 | 1/1960 | Longman | 260—23 |
| 3,063,963 | 11/1962 | Wooten, Jr. et al. | 260—45.75 |
| 3,202,687 | 8/1965 | Vos et al. | 260—419 |
| 3,222,317 | 12/1965 | Kauder | 260—45.75 |
| 3,231,531 | 1/1966 | Buckley et al. | 260—23 |
| 3,298,964 | 1/1967 | Szczepanek et al. | 252—400 |

(Other references on following page)

UNITED STATES PATENTS

| | | | |
|---|---|---|---|
| 2,564,646 | 8/1951 | Leistner et al. | 260—45.7 |
| 2,988,440 | 6/1961 | Bartlett et al. | 71—2.7 |
| 3,342,765 | 9/1967 | Oosterhof et al. | 260—23 |
| 2,867,594 | 1/1959 | Hansen et al. | 260—23 |
| 2,868,745 | 1/1959 | Canarios | 260—23 |
| 2,934,548 | 4/1960 | Fath | 260—429.7 |
| 3,216,957 | 11/1965 | Krumm | 260—23 |
| 3,245,926 | 4/1966 | Parker | 260—23 |
| 3,262,896 | 7/1966 | Ackerman | 260—23 |

OTHER REFERENCES

Enjay Technical Bulletin D-27, 1963, p. 1.
Kirk et al., "Encyclopedia of Chemical Technology," 2nd ed., vol. 7, 1965, p. 272.

DONALD E. CZAJA, Primary Examiner

R. A. WHITE, Assistant Examiner

U.S. Cl. X.R.

260—23, 45.85, 45.95